Oct. 24, 1950      H. W. KUGLER      2,526,955
CUTTING TOOL FOR BLIND RIVETS

Filed Oct. 10, 1944      4 Sheets-Sheet 1

HERBERT W. KUGLER,
INVENTOR

BY
ATTORNEY.

Herbert W. Kugler,
INVENTOR

BY
ATTORNEY.

Oct. 24, 1950 — H. W. KUGLER — 2,526,955
CUTTING TOOL FOR BLIND RIVETS
Filed Oct. 10, 1944 — 4 Sheets-Sheet 3

HERBERT W. KUGLER, INVENTOR.
BY
ATTORNEY.

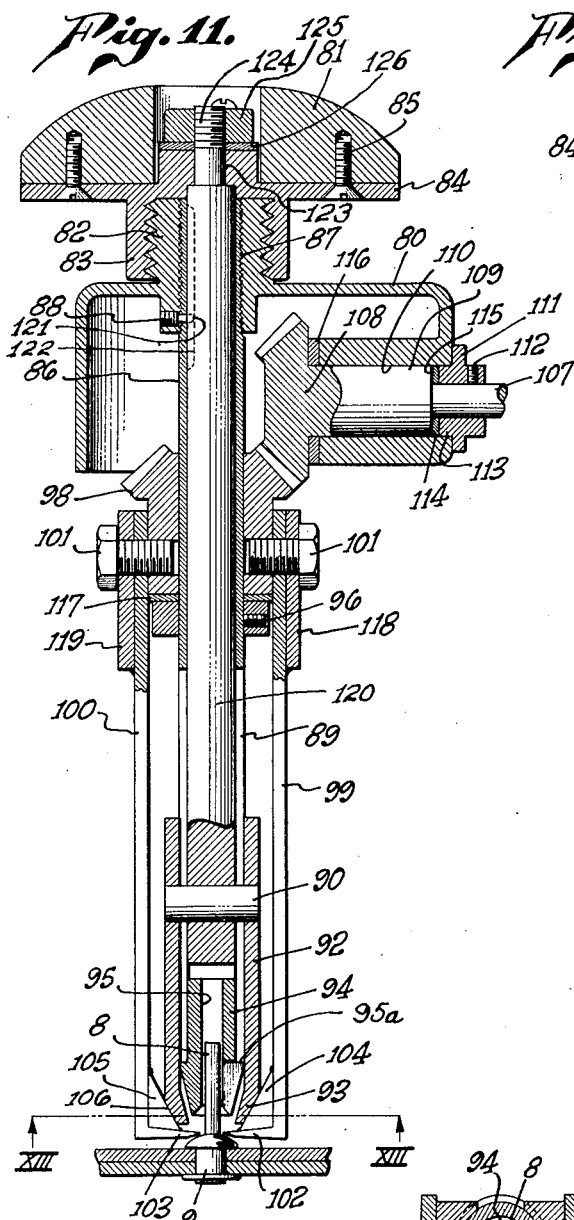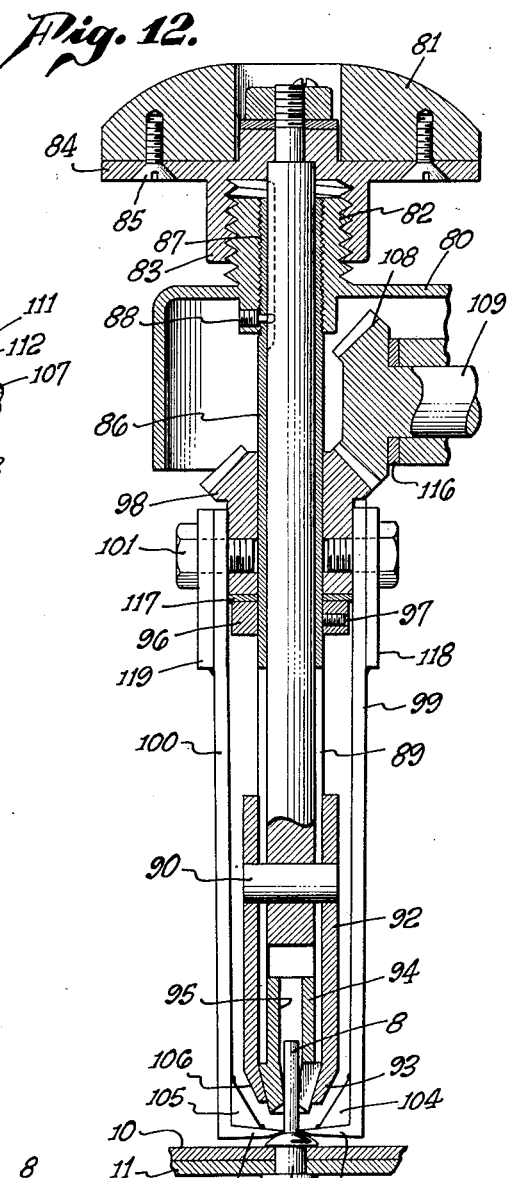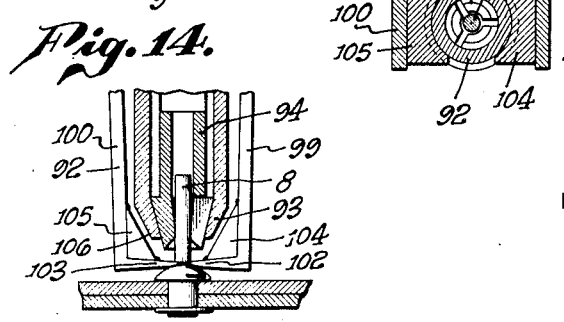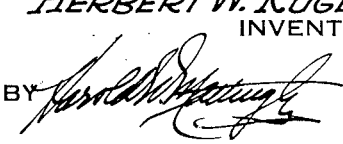

Patented Oct. 24, 1950

2,526,955

UNITED STATES PATENT OFFICE 2,526,955

CUTTING TOOL FOR BLIND RIVETS

Herbert W. Kugler, Los Angeles, Calif., assignor to Cherry Rivet Company, Los Angeles, Calif., a corporation of California Application October 10, 1944, Serial No. 558,049

2 Claims. (Cl. 30—94)

This invention relates to blind rivets and setting tools therefor and has particular reference to a cutting and burring tool for removing the protruding stem from self-plugging blind rivets.

In certain types of riveted construction and particularly in the manufacture of aircraft, it is necessary to make riveted joints in inaccessible locations or in double surfaced structures where access to both sides of the work is difficult or impossible. In these circumstances it is impractical or impossible to use a conventional rivet because of the difficulty or impossibility of applying a bucking bar to the blind end of the rivet. Resort is therefore had to a class of rivet which has come to be known as a blind rivet.

One well known type of blind rivet comprises a tubular rivet body with a head formed on the outside end. Within the bore through the tubular body there is extended a mandrel having a small head on the inner end. This assembly is pushed through the rivet receiving holes and the mandrel is then drawn outwardly. The inner head of the mandrel engages the inner end of the rivet body and expands the same into overlapping relation with the plates through which the holes are drilled, thus forming on the blind side of the plates a rivet head and clamping the plates between the head thus formed and the pre-formed head provided on the exterior of the rivet body.

Ordinarily the pulling force on the mandrel is increased until the mandrel breaks at a necked, scored or otherwise weakened portion outside of the rivet body. The protruding portion of the mandrel or stem is later removed by cutting the same with side cutting pliers, diagonals or specially constructed nippers.

The above described practice embodies a limitation in that the mandrel or stem is held in place by friction and when the rivet is improperly placed in over-sized holes, the stem might work inwards toward the blind side of the rivet. Since much of the shear strength of the rivet is developed by the mandrel which passes through the central hole in the rivet body, it is essential that this mandrel remain in place after the protruding portion of the stem is cut. The usual cutting practice using diagonals or side cutting pliers leaves a chisel-shaped end on the mandrel which is very sharp. This fails to provide the smooth surface on the rivet head which is desired on aircraft structures and also provides a cutting point, increasing the likelihood of injury to workmen and personnel using the finished article.

It is, therefore, an object of the invention to provide a cutting tool for removing the protruding stem on a self-plugging blind rivet which overcomes the above noted disadvantages by cutting the stem along a surface of revolution forming a continuation of the contour of the external rivet head.

It is also an object of this invention to provide a tool of the character set forth in the preceding paragraph in which the cutting operation produces a burr preventing the stem from moving inwardly through the bore in the rivet body.

It is an additional object to provide a tool of the character set forth in the preceding paragraphs which includes a pair of cutting jaws for engaging the stem on opposite sides at the external head of the rivet, together with means for rotating the jaws about the stem while simultaneously moving said jaws toward each other.

It is a still further object of this invention to provide a tool of the character set forth in the preceding paragraph in which one or both of the jaws presents a curved cutting edge serving to prevent the jaws from moving laterally off of the stem during the rotation thereof.

It is also an object of this invention to provide a blind rivet of the self-plugging type in which the rivet body is countersunk at the exterior head to receive a burr formed by cutting and swaging the stem of the rivet.

It is an additional object of this invention to provide a tool for cutting off or trimming the mandrel of a rivet of the character set forth wherein the cutters are formed as double beveled rollers to provide for both the cutting and burring action.

Another object of the invention is to provide a tool for cutting off or trimming rivet mandrels which may be readily adapted for connection with hand drills, carpenter's braces or power driven rotary tools for producing a rotation of the trimming device.

Another object of the invention is to provide a tool of the character set forth in the preceding paragraph wherein the mandrel is engaged in a centering device upon the tool to prevent improper displacement of the roller cutters as they rotate to cut the mandrel.

It is a still further object of the invention to provide a tool of the character set forth in the preceding paragraph wherein the cutting knives are adapted to be moved toward each other as they progressively cut into the mandrel merely by pressure exerted upon a hand drill or other power tool to which the trimming device is attached.

In certain types of rivets of the character described and particularly when rivets are placed in over-sized holes, there is frequently a tendency for the mandrel to rotate relative to the body of the rivet, and it is, therefore, an object of this invention to provide a trimming or cutting tool adapted to cut off the rivet by the rotation of cutting knives about the mandrel while the mandrel is held in a stationary position against rotation by a portion of the cutting tool.

Another object of the invention is to provide a device of the character set forth in the preceding paragraph wherein the cutting device is provided with a chuck member adapted to slip over the protruding end of the rivet mandrel and thereby clamped securely thereon to hold the rivet against rotation during the cutting off of the mandrel.

Other objects and advantages of this invention will become apparent from a study of the following specifications, read in connection with the accompanying drawing, wherein:

Fig. 11 is a vertical sectional view taken through a still further modified form of cutting or burring tool which may be employed in the practice of my invention illustrating the position of the parts at the time of their initial engagement with the mandrel of the rivet;

Fig. 12 is a vertical sectional view similar to Fig. 11 but illustrating the position of the parts after the rivet mandrel has been gripped to hold the same stationary and the cutting blades have been moved into position to engage the rivet;

Fig. 13 is a detailed sectional view taken along the line XIII—XIII of Fig. 11; and Fig. 14 is a fragmentary sectional view illustrating the position of the gripping and cutting members of the tool illustrated in Figs. 10 and 11 and illustrating the position they will assume at the termination of cutting off a rivet mandrel.

Figure 1:
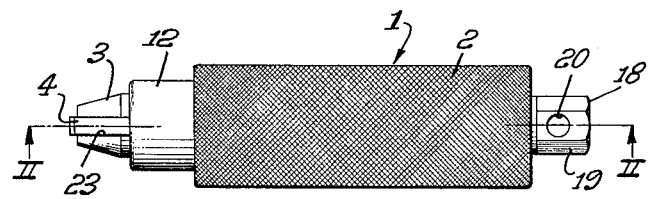
Fig. 1 is a side elevational view illustrating the general form and appearance of a cutting and burring tool comprising the preferred form of this invention.
Figure 2:
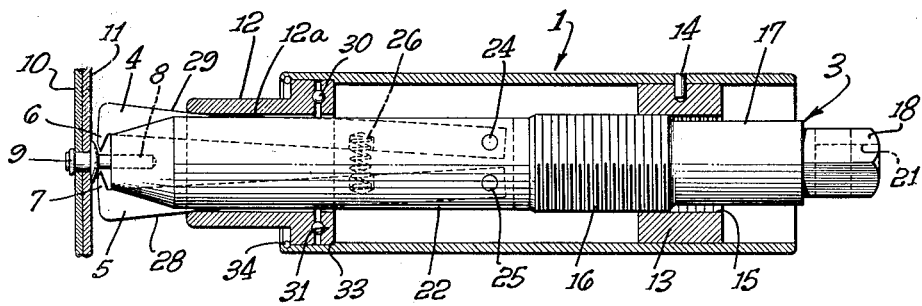
Fig. 2 is a sectional view taken along the line II—II of Fig. 1 and showing the relative disposition of the parts preparatory to cutting the stem of a blind self-plugging rivet.
Figure 3:
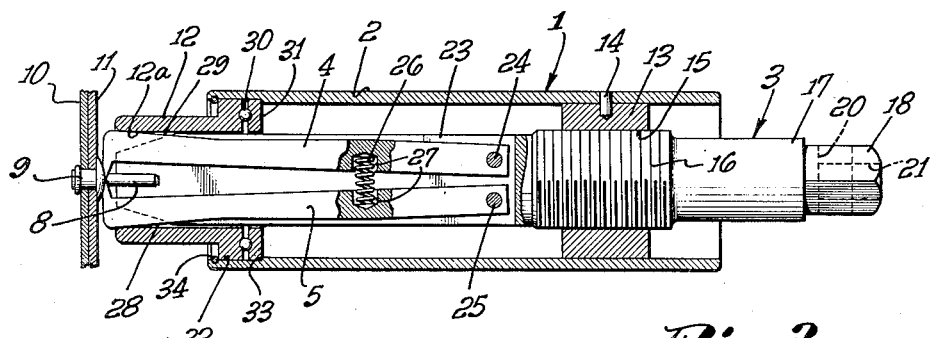
Fig. 3 is a view similar to Fig. 2 but illustrating additional parts in section and showing also the relative positions occupied by the parts of the device at the completion of a stem cutting operation.

Referring to the drawings, the preferred embodiment of the invention is illustrated in Figs. 1 through 3 as comprising an outer case or holder 1 which is, by preference, knurled as shown at 2 to facilitate holding the same in the hand. Within the holder 1 there is rotatably supported a carrier 3 upon which is mounted a pair of cutting arms or jaws 4 and 5. The jaws 4 and 5 carry cutting blades 6 and 7 adapted to engage the protruding stem 8 of a previously installed blind rivet 9 used to rivet together plates 10 and 11. The jaws 4 and 5 are mutually engaged by a pressure sleeve 12 which is mounted within the holder 1.

As is best shown in Figs. 2 and 3, the holder 1 comprises a short section of metallic tubing. Within the tubing and near one end thereof there is placed a nut 13 which is held as by means of a pin 14 interengaging the nut 13 and holder 1. The nut 13 is bored and threaded as shown at 15 to receive male threads 16 formed upon a shank portion 17 of the carrier 3. The shank 17 is made sufficiently long to extend a portion 18 beyond the end of the holder 1. This portion is preferably given a hexagonal cross section as shown at 19 and may be transversely drilled as at 20 and provided with a rectangular recess 21 in the outer end to permit the application to the stem 17 of different and varied forms of tools, handles or power driving mechanisms intended to effect a rotation of the carrier 3 about its longitudinal axis.

The portion 22 of the carrier 3 which is positioned on the opposite side of the threads 16 from the shank 17 is by preference made cylindrical and is slotted longitudinally as shown at 23 to receive the jaws 4 and 5. The jaws 4 and 5 comprise substantially straight rectangular bar members placed one above the other and pivotally mounted at their innermost ends to the carrier 3 as by means of pivot pins 24 and 25. The jaws are normally urged away from each other as by means of a compression spring 26 interposed between the jaws with its ends received in suitable recesses 27 formed in the jaws 4 and 5.

From an inspection of Figs. 2 and 3, it will be observed that the jaws 4 and 5 are so shaped and so mounted upon the rotatable carrier as to present an outwardly diverging contour at all times as they are engaged with the bore 12a of the sleeve 12. This may be accomplished either by forming the jaws with straight outer surfaces and mounting the inner ends of the jaws by their pivot pins 24 and 25 in a position relatively close together as compared with the diameter of the bore 12a or by forming angularly disposed outer surfaces 28 and 29 upon the jaws or by the combination of both as shown in Figs. 2 and 3. By this construction the jaws will be moved toward each other from a relatively open position such as shown in Fig. 2 to a relatively closed position as shown in Fig. 3 by moving the pressure sleeve 12 axially along the jaws 4 and 5 toward the plates 10 and 11.

In the construction shown, this movement is accomplished automatically by forming the inner end of the sleeve 12 as a thrust bearing including a plurality of anti-friction members 30 confined between the inner end of the sleeve 12 and a bearing race 31. The race 31 is received within the end of a counterbore 32 formed in the end of the holder 2 and bears against a thrust shoulder 33 defined by the bottom of the counterbore 32. Movement of the thrust sleeve 12 axially out of the holder 2 is prevented by means of a snap ring 34 installed in the conventional manner.

Figure 4:
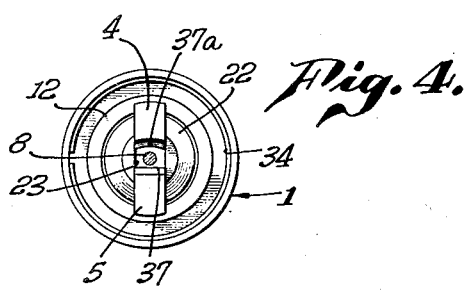
Fig. 4 is an end elevational view of the tool shown in Figs. 1 through 3 and illustrating particularly the shape of the cutting blades which are formed on the stem cutting jaws.

The blades 6 and 7 which are formed on the ends of the jaws 4 and 5 are preferably formed integrally with the jaws 4 and 5 and comprise inwardly turned ends of the jaws. These inwardly turned ends are sharpened to a chisel point, preferably in the manner shown in Fig. 5, as by means of oppositely inclined surfaces 35 and 36 meeting each other in a sharp cutting edge 37. By preference, the cutting edge 37 of one of the jaws, as for example, the jaw 5, is straight when viewed from the end as in Fig. 4, whereas, the cutting edge of the other jaw (4, for example) is curved as shown at 37a in Fig. 4. The use of the curved edge 37a in conjunction with the straight edge 37 tends to prevent the blades from advancing along the rivet stem 8 as the jaws are rotated.

Figure 5:
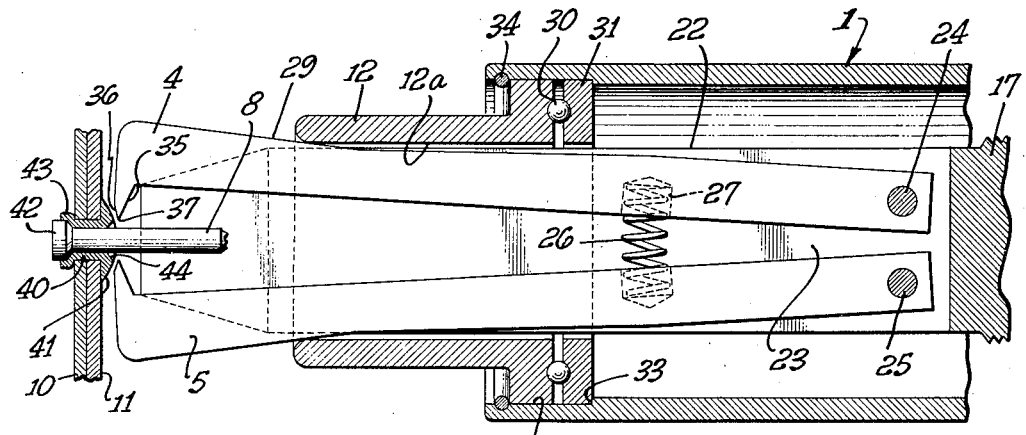
Fig. 5 is a fragmentary enlarged sectional view illustrating an improved blind rivet construction and showing the mode of applying the cutting and swaging tool preparatory to cutting the rivet stem.

The device is used by first positioning the parts as shown in Fig. 2 so that the jaws 4 and 5 are open, separating the cutting edges 37 and 37a a distance sufficient to allow the stem 8 to pass between the blades. The device is then placed over the stem 8 of the rivet in a position such as is shown in Figs. 2 and 5 and while the holder 2 is held in the hand or otherwise suitably prevented from rotating, the carrier 3 is rotated by the application of a suitable hand tool or power means to the protruding end 18 of the carrier 3.

Figure 6:
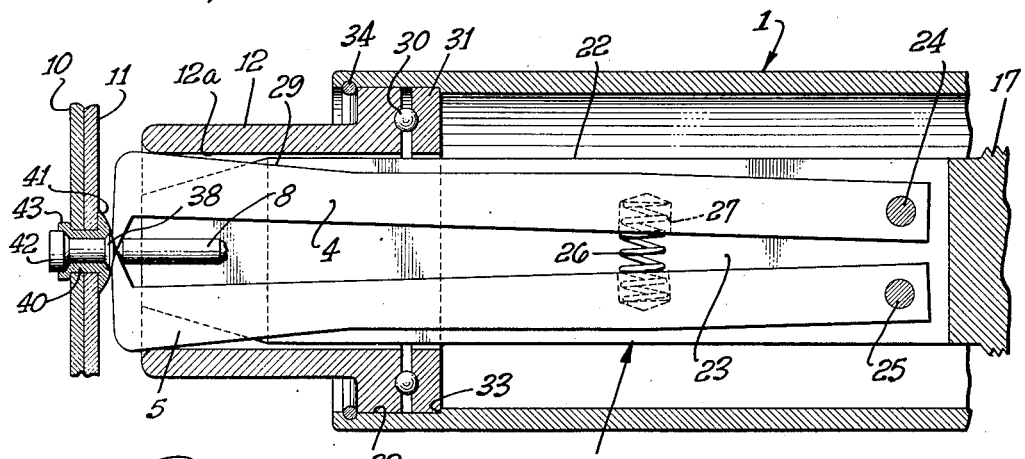
Fig. 6 is a view similar to Fig. 5 but showing the manner in which the stem is cut and the manner in which the cutting operation produces a burr serving to prevent the stem from later coming out of the rivet body.

As the carrier 3 is rotated, the jaws 4 and 5 and the integral cutting blades 6 and 7 are likewise rotated about the rivet stem 8. At the same time the nut 13 is caused to advance along the carrier 3 toward the riveted plates 10 and 11 by reason of the interengagement of the threads 15 and 16. This movement of the nut 13 similarly moves the holder 2 and this is transmitted through the thrust bearing 30—31 to the pressure sleeve 12 forcing the same axially over the inclined outer jaw surfaces 28 and 29. As the thrust sleeve 12 is moved from the position shown in Figs. 2 and 5 to the position shown in Figs. 3 and 6, the jaws 4 and 5 are moved inwardly toward each other simultaneously with their rotation about the stem 8. During this operation the thrust sleeve 12 rotates with the jaws 4 and 5, the relative rotation between the sleeve 12 and the holder 2 taking place at the thrust bearing 30—31.

As the jaws 4 and 5 are thus moved toward each other, the cutting blades 6 and 7 gradually bite into the rivet stem 8. This increasing pressure accompanied by the rotation of the jaws about the stem 8 forms a V-shaped groove extending about the stem which increases in depth as the operation continues.

It should be noted that the stem 8 is not cut in the sense that material is removed in the form of chips or shavings. Instead the groove is formed by the displacement of the material of the stem. At the completion of the operation the protruding portion of the stem 8 is, of course, severed from the portion remaining within the rivet body 9. The deforming operation serves, however, to produce a burr on the end of the remaining stem portions such as is shown at 38 in Fig. 6 and 39 in Fig. 7. These burrs prevent the remaining portion of the rivet stem 8 from moving inwardly at any time subsequent to the cutting of the protruding portion of the stem.

There is shown in Fig. 5 an improved form of prior self-plugging rivet which is similar to a now well known form of blind self-plugging rivet in that it includes a tubular rivet body 40 having formed thereon an external head 41 of any desired shape. Within the bore of the tubular body 40 there is placed the mandrel 8 which carries an inner head 42 which, upon being drawn axially outward, forms the inner rivet head 43. The improvement which has been made lies in forming a counterbore, countersink or recess 44 in the outer surface of the external rivet head 41. This recess 44 is provided for receiving the burr 38 which is formed by the operation of the cutting tool of the present invention. In so doing, it permits the forming of a burr 38 of substantial dimensions capable of resisting all of the usual forces tending to cause disassociation of the rivet stem 8 from the rivet body 9.

Figure 7:
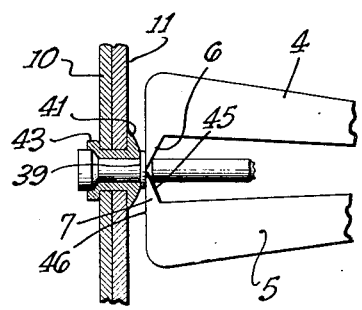
Fig. 7 is a fragmentary view showing a modification of the invention using a modified shape of cutting blade.

Also, the burr which is formed has an external surface of revolution which closely conforms to a continuation of the external contour of the rivet head 41, thus avoiding the production of an externally positioned burr 39 such as is shown in Fig. 7 and such as usually results when the presently known forms of self-plugging blind rivets are used.

When the cutting tool of this invention is used with the well known type of self-plugging blind rivet shown in Figs. 2, 3 and 7, improved results may oftentimes be obtained by using a tool fitted with modified cutting jaws 4 and 5 constructed as shown in Fig. 7. The jaws 4 and 5 and the blades 6 and 7 formed thereon are identical with those previously described except for the manner of sharpening to form the cutting edge. According to the embodiment shown in Fig. 7, the cutting edge is formed by the intersection of an inner inclined surface 45 and an outer straight surface 46 which is extended substantially parallel to the direction of the movement imparted to the cutting edges by the pivoting of the jaws 4 and 5 toward each other. A cutting tool equipped with jaws of this character may be used to very readily form a burr of the character shown in Fig. 7 at 39.

From the foregoing it will be observed that the invention provides a new self-plugging blind rivet which is characterized by the provision of a recess in the exterior rivet head to receive a burr formed by cutting and swaging the protruding portion of the rivet stem.

It will also be observed that this invention provides a novel cutting tool for so cutting and swaging the protruding portion of the rivet stem as to cut the stem and at the same time form thereon a burr of such character as to prevent the remaining stem portion from becoming inadvertently loosened from the rivet body and of such character as to form a continuation of the external contour of the rivet head.

Figures 8, 9, 10:
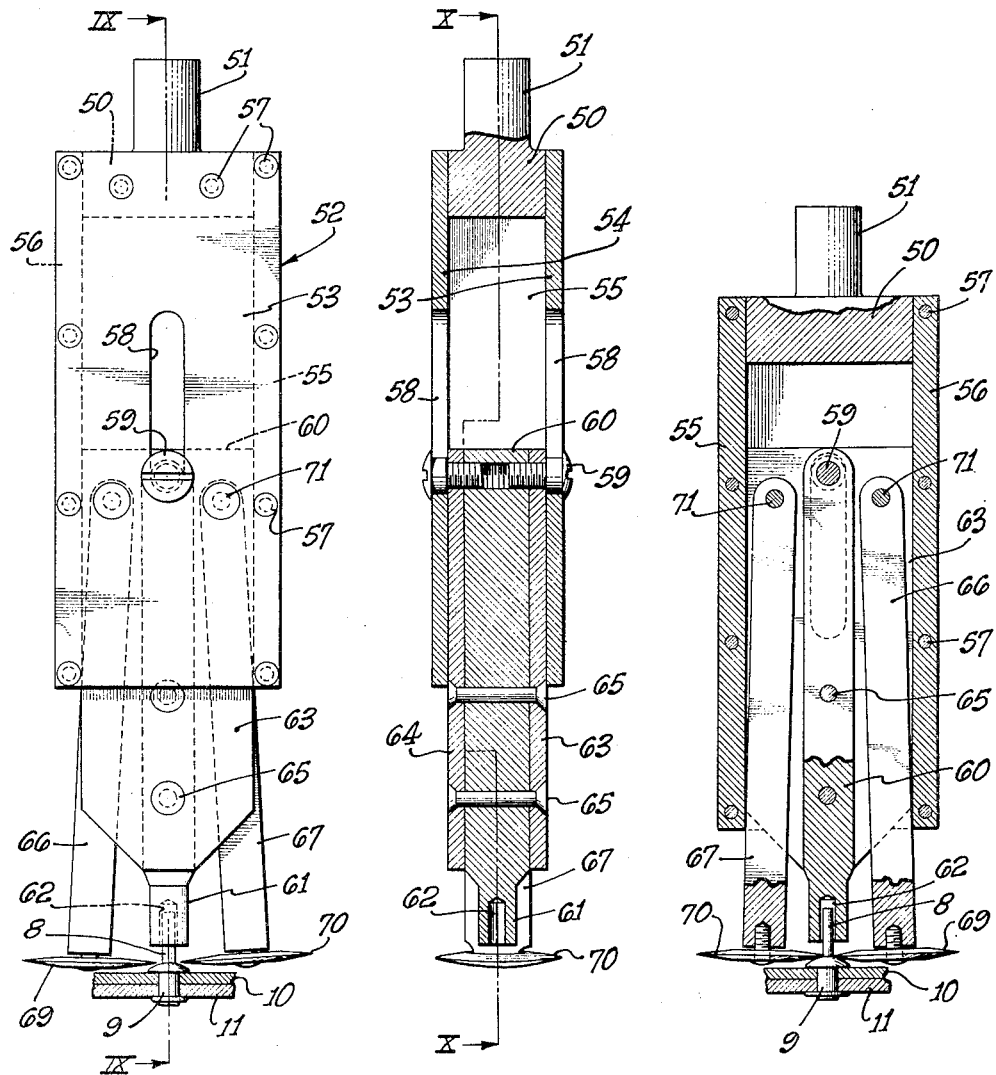
Fig. 8 is a front elevational view of a modified form of cutting and burring tool which may be employed in the practice of my invention.
Fig. 9 is a vertical sectional view taken substantially along the line IX—IX of Fig. 8.
Fig. 10 is a vertical sectional view taken along the line X—X of Fig. 9 but illustrating the parts of the cutting device in the position they will assume at the completion of the cutting off of the rivet mandrel.

In Figs. 8, 9 and 10 I have illustrated a modified form of cutting and burring tool which may be employed to cut off mandrel rivets and to form a burr thereon particularly adapted for use with some form of hand tool for producing a rotation of the cutting or burring tool, such hand tool may readily be a carpenter's brace, a hand drill or any of the motor-operated hand power tools adapted to produce a rotary motion and having a suitable chuck for receiving a stem formed upon the cutting and burring tool of my invention.

The form of cutting and burring tool illustrated in Figs. 8, 9 and 10 comprises a head 50 preferably constructed as an elongated, laterally extending block of metal or similar material having upstanding from its center a cylindrical boss 51 adapted to be inserted into the chuck or hand tool with which it is to be associated. Secured to the head 50 is an elongated box-like structure 52 which may comprise a front wall 53, a rear wall 54 and opposed side walls 55 and 56. If desired, the box-like structure may be formed integrally with the head 50 or may be readily constructed by employing separate plates for each of the side walls and securing them together and to the head 50 by means of suitable screws or rivets 57.

The front and rear walls 53 and 54 are provided with aligned elongated slots 58, through each of which extends a headed screw 59 into a central block 60, the lower end of which is reduced as indicated in Figs. 8 and 9 to provide a guide end 61, from the lower end of which extends a bore 62 substantially the same diameter as the diameter of the mandrel 8 of a rivet so that when the block 60 is placed upon the mandrel 8, the block may be rotated about the mandrel as a center.

As indicated in Figs. 9 and 10, the central block 60 is fixed to a pair of side plates 63 and 64 as by means of rivets 65, or the central block 60, may, if desired, be constructed integrally with the side plates 63 and 64 and have cut-out portions formed therein to receive a pair of legs 66 and 67 to carry the cutters 69 and 70.

The cutters 69 and 70 are preferably in the form of disks, beveled upon their lower and upper surfaces to provide a wedge-like cutting surface adapted to engage and cut into the mandrel 8 as the tool is rotated about the mandrel.

The legs 66 and 67 are each pivotally mounted as indicated at 71 to the side plates 63 and 64, the location of the pivot points being such that when the block 60 is in its lowermost position as shown in Figs. 8 and 9, the legs may separate apart sufficiently to readily admit the mandrel 8 between the cutters 69 and 70, but the lowermost ends of the side walls 55 and 56 engage and bear upon the legs 66 and 67 at such angle that as pressure is exerted downwardly upon the tool to cause the block 60 to recede into the box-like chamber 52, the legs 66 will be moved toward each other; that is, toward the center of the mandrel 8 in such fashion as to cut and burr the mandrel until in the final position of the tool the cutters 69 and 70 substantially meet at the center of the mandrel, cutting the mandrel completely off.

By employing the beveled edge disks 69 and 70, it will be apparent that the cutting will be of such character as not only to cut off the mandrel 8 but to form the burr which may, like the burr 33, be received in the beveled counterbore of the rivet body or will at least form a sufficient burr extending above the body of the rivet to insure that the mandrel will not fall out or be inadvertently displaced from the body of the rivet.

Retraction of the hand tool will cause the box-like housing 52 to move upwardly relative to the block 60 and permit the legs 66 and 67 to move laterally with respect to each other ready to receive between them another mandrel. If desired, springs (not shown) corresponding to springs 27 may be interposed between the legs 66 and the block 60 to insure the lateral movement thereof.

In Figs. 11 through 14 I have illustrated a still further modified form of mandrel cutting and burring device which may be employed, this form of device being particularly adapted for the cutting off of mandrels in which the rivet has been placed in an over-sized hole and there may be a tendency for the mandrel to rotate relative to the rivet.

This form of cutter comprises a suitable housing 80, to the upper end of which is secured a handle or knob 81 as by forming upon the housing 80 an upstanding threaded boss 82 adapted to be threadedly received in a downwardly extending threaded boss 83 formed upon a knob supporting plate 84 to which the knob 81 is secured by means of screws 85.

Extending longitudinally through the housing 80 is a tubular member 86, such tubular member being threadedly secured as indicated at 87 to the interior of the threaded boss 82 and secured therein against rotation by means of a suitable set screw 88.

The lower end of the tubular member 86 is slotted longitudinally as indicated at 89 to provide a passageway through which passes a cross pin 90 which is secured in a tubular slide 92 telescopically mounted upon the lower end of the tubular member 86. The lower end of the tubular slide 92 is formed with an inwardly tapering end section 93 which surrounds a split collet member 94, the collet member 94 having a central bore 95 adapted to receive the upwardly projecting end of the rivet mandrel 8 and having a radially extending shoulder 95a adapted to abut the lower end of the tubular member 86.

To provide for actuating the collet member 94 an actuating rod 120 is slidably mounted within the sleeve 86. The rod 120 is held against rotation by means of the set screw 88 which may include a pin portion 121 engaging the keyway 122 cut in the rod 120. The upper end of the rod 120 is preferably reduced in diameter as shown at 123 and passed through a suitable aperture in the knob supporting plate 84 to provide for rotation of the knob 81 relative to the rod 120. The upper end of the rod 120 is threaded as indicated at 124 to receive a thrust nut 125 beneath which there is placed a suitable thrust washer 126. This construction provides for axially shifting the rod 120 as a result of rotation of the knob 81, it being understood that the rod 120 is held against rotation during the time the knob 81 is rotated. The cross pin 90 hereinbefore mentioned is passed through a suitable aperture in the lower end of the rod 120 and so serves to interconnect the tubular slide 92 with the rod 120.

Thus when the cutting device is placed upon the stem of the rivet mandrel 8 and the knob 81 is backed off to the position indicated in Fig. 12, the rod 120 will be moved axially upward to lift the tubular slide 92, whereby the tapered surface 93 of the tubular slide 92 will engage the tapered external surface of the collet 94 and squeeze the collet into tight engagement upon the mandrel. It will be understood, of course, that the collet 94 is split at its lower end to permit radial inward movement of the several sections of the collet to perform this gripping operation.

Surrounding the sleeve 86 is a bearing washer 96 secured in place thereon as by means of a set screw 97 (see Fig. 12), the washer 96 acting as a bearing about which a beveled gear 98 may rotate. Attached to diametrically opposite sides of the shank of the bevel gear 98 are a pair of spring leaves 99 and 100 as by means of screws 101, the lower ends of the spring leaves being formed with inwardly projecting cutters 102 and 103, respectively, these cutters being beveled in the same fashion as described for the cutters 4 and 5 of that form of the device shown in Figs. 1 through 7 to engage and bite into the mandrel as the spring leaves and cutters are rotated about the mandrel.

The spring leaves 99 and 100 are so shaped that they normally are urged toward each other to a position where the cutting edges of the cutters 102 substantially meet with enough spring force to perform the cutting action. When the tool is to be placed upon or removed from the mandrel, turning of the knob 81 to release the collet also spreads the spring leaves 99 and 100 to a position separating the cutters 102 and 103 a sufficient distance apart to readily admit the mandrel 8 therebetween. This is accomplished by providing a pair of triangular blocks 104 and 105, respectively, in the corners formed between the spring leaves and their respective cutters and by providing a tapered external surface 106 to the exterior of the tubular slide 92 adapted to be pressed against the angular surface of the blocks 104 and 105 and thus force the spring leaves apart.

Rotational movement may be imparted to the bevel gear 98 and the spring leaves 99 and 100 by any suitable means such as a shaft 107 extending laterally into the housing 80 and terminating in a bevel gear 108 meshed with the gear 98, the shank 109 of the bevel gear 108 forming a bearing surface rotatably mounted in a laterally extending bore 110 formed in the housing 80. The bevel gear 108 is held against displacement in its bearing bore by means of a lock washer 111 secured as by means of a set screw 112 to the shaft 107, the lock washer preferably having a boss 113 conforming in diameter with the diameter of the bore 110 so as to be received therein while a shim or washer 114 may be interposed between the washer 111 and the shoulder 115 formed between the shaft 107 and the shank 110 to insure a snug fit between the beveled gears 108 and 98.

Wear washers 116 and 117 may be provided, respectively, between the bevel gears 108 and 98 and their respective bearing surfaces to take up thrust and to provide wearing surfaces for the bearings which may be readily replaced.

While the leaf springs 99 and 100 may of themselves be so constructed as to provide the necessary inwardly directed forces required to cut off or trim the stem or mandrel 108, it may be found desirable to add additional springs 118 and 119, respectively, to each of these leaf springs 99 and 100, such addition being readily made as indicated in the drawings by securing such additional springs to the outer surfaces of each of the leaf springs by means of the screws or bolts 101.

It will be apparent from the foregoing that the cutting and burring device illustrated in Figs. 11 through 14 may be readily placed upon a mandrel to be cut, the knob operated to grasp and securely hold the mandrel 8 in a stationary position during the cutting operation, while rotation of the leaf springs 99 and 100 with their respective cutters will bite into and gradually cut off the mandrel, leaving a slight burr at the upper end of the cut mandrel, insuring against the inadvertent displacement of this mandrel.

While I have shown and described the preferred embodiment of my invention, I do not desire to be limited to any of the details of construction shown or described herein, except as defined in the appended claims.

What is claimed as new is:

1. In a tool for cutting off protruding stems of blind rivets, the combination of: an outer case to be grasped by the hand of a user; a plurality of cutter jaws, each having a cutting blade disposed at one of its ends; a jaw carrier extending into said case; mounting means mounting said jaws on said carrier for movement of said blades toward and away from each other; thread means mounting said carrier in said case, with the blades of said jaws projecting from one end of said case, whereby rotation of said carrier while said case is grasped will retract said jaws longitudinally of said case; and interengaging surfaces on said case and said jaws for wedging said blades toward each other as said jaws are retracted toward said case.

2. In a tool for cutting off protruding stems of blind rivets, the combination of: an outer case to be grasped by the hand of a user; a plurality of cutter jaws, each having a cutting blade disposed at one of its ends; a jaw carrier extending into said case; mounting means mounting said jaws on said carrier for movement of said blades toward and away from each other; thread means mounting said carrier in said case, with the blades of said jaws projecting from one end of said case, whereby rotation of said carrier while said case is grasped will retract said jaws longitudinally of said case; a pressure member surrounding said jaws adjacent the ends of said jaws carrying said blades; means mounting said member on said case for non-retractable free rotation relative to said case; and interengaging surfaces on said jaws and said member to wedge said jaws toward each other as said jaws are retracted toward said case.

HERBERT W. KUGLER.

REFERENCES CITED

The following references are of record in the file of this patent:

UNITED STATES PATENTS

| Number | Name | Date |
| --- | --- | --- |
| 75,870 | Daboll | Mar. 24, 1868 |
| 595,727 | Oefinger | Dec. 21, 1897 |
| 727,610 | Galloway | May 12, 1903 |
| 1,085,967 | Brown | Feb. 3, 1914 |
| 1,107,511 | Gallagher | Aug. 18, 1914 |
| 1,122,364 | Brown | Dec. 29, 1914 |
| 1,138,395 | Nelson | May 4, 1915 |
| 1,392,705 | Rhodes | Oct. 11, 1921 |
| 1,665,751 | Neill | Apr. 10, 1928 |
| 1,764,911 | Treat | June 17, 1930 |
| 2,061,628 | Huck | Nov. 24, 1936 |
| 2,103,597 | Ravenscroft | Dec. 28, 1937 |
| 2,114,493 | Huck | Apr. 19, 1938 |
| 2,202,416 | Day | May 28, 1940 |
| 2,371,423 | Buchet | Mar. 13, 1945 |